United States Patent
Javeri et al.

(10) Patent No.: US 11,511,666 B2
(45) Date of Patent: Nov. 29, 2022

(54) SYSTEMS AND METHODS FOR UTILIZING MACHINE LEARNING TO IDENTIFY VEHICLE SURROUNDINGS, ROUTE CONDITIONS, AND POINTS OF INTEREST

(71) Applicant: Verizon Patent and Licensing Inc., Arlington, VA (US)

(72) Inventors: Vipul Shyam Javeri, Atlanta, GA (US); Mourya C. Darivemula, Sugar Hill, GA (US); Bo-Na Lee, Atlanta, GA (US); Aaroon Thowfiq Shahul Hameed, Alpharetta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 631 days.

(21) Appl. No.: 16/665,793

(22) Filed: Oct. 28, 2019

(65) Prior Publication Data
US 2021/0122292 A1 Apr. 29, 2021

(51) Int. Cl.
*G06K 9/00* (2022.01)
*B60Q 9/00* (2006.01)
(Continued)

(52) U.S. Cl.
CPC .............. *B60Q 9/00* (2013.01); *G06N 20/00* (2019.01); *G06V 20/58* (2022.01); *G07C 5/008* (2013.01); *H04N 7/188* (2013.01); *H04L 51/52* (2022.05)

(58) Field of Classification Search
CPC .......... B60Q 9/00; G06N 20/00; G06V 20/58; G06V 20/56; G07C 5/008; H04N 7/188;
(Continued)

(56) References Cited

U.S. PATENT DOCUMENTS 9,865,019 B2 * 1/2018 Bogovich ........ G08G 1/096816
10,156,848 B1 * 12/2018 Konrardy ........... G06Q 30/0284
(Continued)

FOREIGN PATENT DOCUMENTS

CA 2416373 C * 7/2007 ................ B64F 5/40
CN 109804223 A * 5/2019 ............ B60W 30/09
(Continued)

OTHER PUBLICATIONS

ITS International, "Toyota to launch road maintenance study in Japan", https://www.itsinternational.com/categories/utc/news/toyota-to-launch-road-maintenance-study-in-japan/, Apr. 19, 2019, 1 page.

*Primary Examiner* — Mahendra R Patel

(57) ABSTRACT

An in-vehicle device may receive an alert that includes first vehicle identifying a first vehicle and first location data identifying a first location, and may determine whether a second location of the in-vehicle device is in a geographic area associated with the first location. The in-vehicle device may cause, when the second location is determined to be in the geographic area associated with the first location, images or video to be captured of second vehicles, and may process the captured images or video, with a machine learning model, to determine second vehicle data in real time relative to capturing the images or video. The in-vehicle device may determine whether the second vehicle data substantially includes the first vehicle data, and may provide a notification to a device when the second vehicle data substantially includes the first vehicle data.

20 Claims, 13 Drawing Sheets

(51) Int. Cl.
  *G06N 20/00* (2019.01)
  *H04N 7/18* (2006.01)
  *G07C 5/00* (2006.01)
  *G06V 20/58* (2022.01)
  *H04L 51/52* (2022.01)

(58) Field of Classification Search
  CPC .. H04L 51/32; H04L 12/1845; H04L 12/1895
  USPC .......................................................... 382/104
  See application file for complete search history.

(56) References Cited

U.S. PATENT DOCUMENTS

| | | | | |
|---|---|---|---|---|
| 10,324,463 B1* | 6/2019 | Konrardy | ............. | G05D 1/0278 |
| 10,633,003 B1* | 4/2020 | Abundis Vargas | ... | B60W 50/14 |
| 10,748,419 B1* | 8/2020 | Fields | ................... | H04N 7/183 |
| 10,885,592 B2* | 1/2021 | Hsu-Hoffman | ......... | G06Q 40/08 |
| 10,997,430 B1* | 5/2021 | Slavin | ..................... | H04W 4/38 |
| 2017/0309092 A1* | 10/2017 | Rosenbaum | ........... | G07C 5/008 |
| 2018/0003516 A1* | 1/2018 | Khasis | ................... | G08G 1/207 |
| 2018/0047288 A1* | 2/2018 | Cordell | ................... | H04W 4/02 |
| 2018/0341261 A1* | 11/2018 | Kislovskiy | ......... | G01C 21/3438 |
| 2019/0147260 A1* | 5/2019 | May | ..................... | G06K 9/6288 |
| | | | | 382/103 |
| 2019/0162549 A1* | 5/2019 | Fouad | .................... | G06N 3/006 |
| 2020/0372796 A1* | 11/2020 | Gajapala | ............. | G08G 1/0141 |

FOREIGN PATENT DOCUMENTS

| | | | | |
|---|---|---|---|---|
| CN | 110402371 A | * | 11/2019 | ............ B60W 30/08 |
| CN | 111902694 A | * | 11/2020 | ............ B60W 30/08 |
| EP | 3416153 A1 | * | 12/2018 | ............ B60R 11/04 |
| WO | WO-9918410 A1 | * | 4/1999 | ............ G01C 15/00 |
| WO | WO-2017120224 A1 | * | 7/2017 | ........... G06K 9/6278 |

* cited by examiner

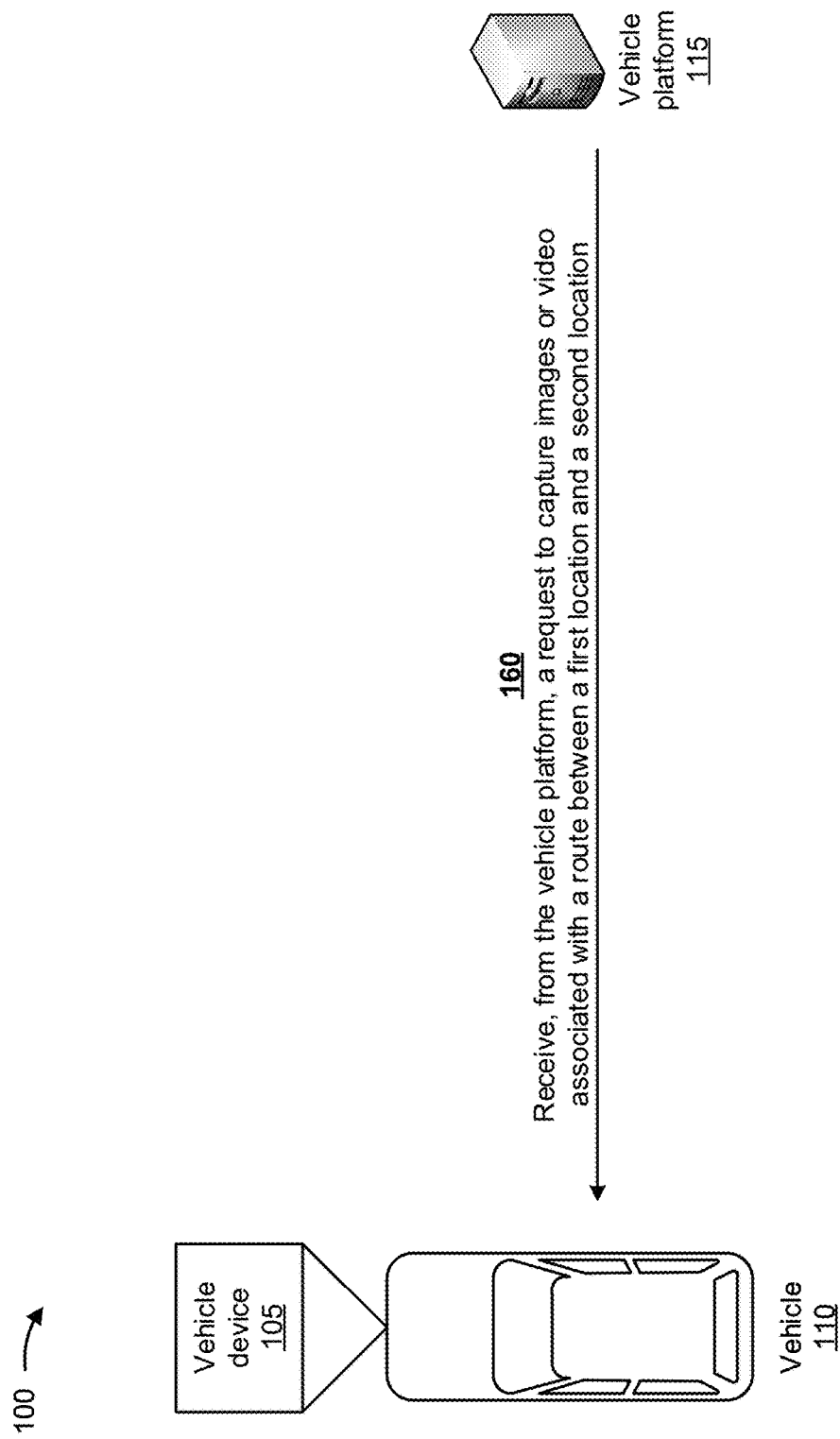

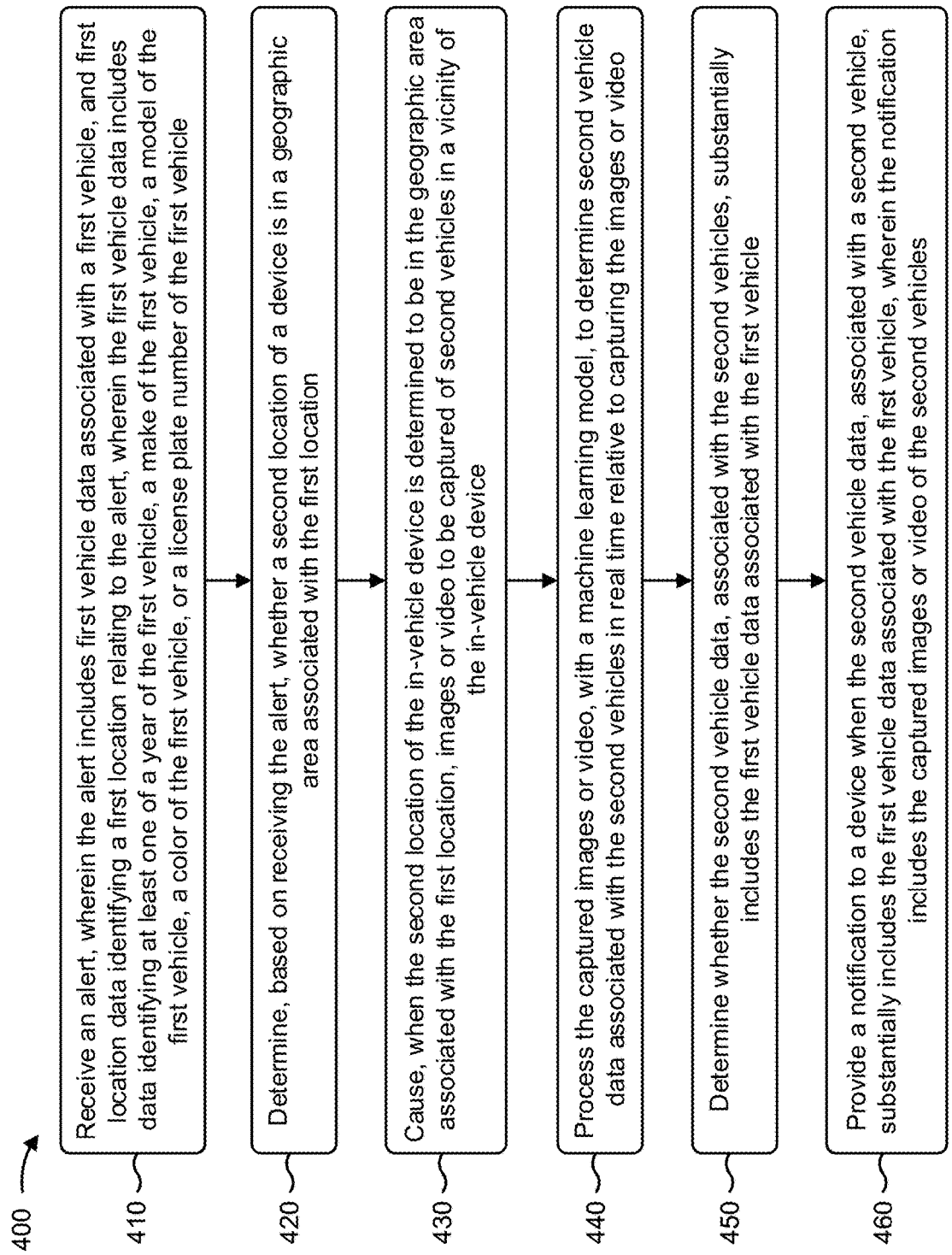

SYSTEMS AND METHODS FOR UTILIZING MACHINE LEARNING TO IDENTIFY VEHICLE SURROUNDINGS, ROUTE CONDITIONS, AND POINTS OF INTEREST

BACKGROUND

Vehicles are equipped with several vehicle devices that enable capture of images or video surrounding the vehicle. For example, a vehicle may include a dash camera, several parking assist cameras, a backup assist camera, an on-board diagnostic (OBD) device, an electronic control unit (ECU), and/or the like that enable capture of images or video for different purposes.

BRIEF DESCRIPTION OF THE DRAWINGS

FIGS. 1A-1J are diagrams of one or more example implementations described herein.

FIG. 4 is a flow chart of an example process for utilizing machine learning to identify vehicle surroundings, route conditions, and/or points of interest based on captured images or video.

DETAILED DESCRIPTION OF PREFERRED EMBODIMENTS

Figure 1A:
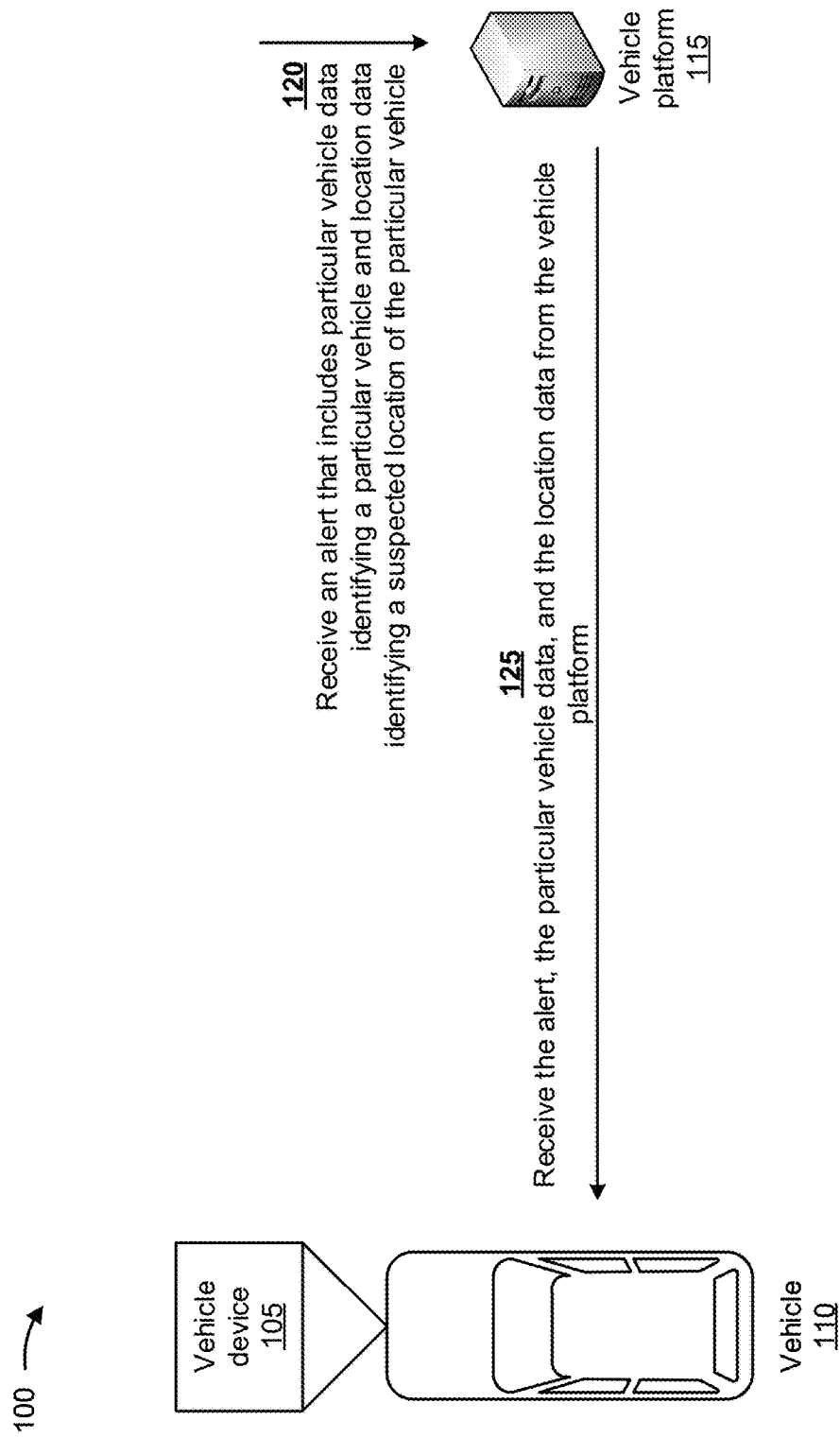

The following detailed description of example implementations refers to the accompanying drawings. The same reference numbers in different drawings may identify the same or similar elements.

Vehicle devices may capture images or video for specific purposes based on instructions received from an OBD device, an ECU, and/or the like. For example, the ECU may instruct parking assist cameras to capture images or video when the vehicle is being parked. However, the vehicle devices are unable to capture images or video for purposes other than the specific purposes. For example, if a vehicle is located near a location of criminal activity, dangerous driving conditions, and/or the like, the vehicle devices are unable to capture images or video of the location that may be useful in stopping the criminal activity (e.g., a child abduction), preventing accidents due to the dangerous driving conditions, and/or the like. Thus, computing resources (e.g., processing resources, memory resources, and/or the like), communication resources, networking resources, emergency response resources, and/or the like are wasted in responding to the criminal activity or the vehicle accidents, investigating the criminal activity or the vehicle accidents, and/or the like.

Some implementations described herein provide a vehicle device that utilizes machine learning to identify vehicle surroundings, route conditions, and/or points of interest based on captured images or video. For example, the vehicle device may receive an alert that includes first vehicle data associated with a first vehicle, and first location data identifying a first location relating to the alert. The first vehicle data may include data identifying a year of the first vehicle, a make of the first vehicle, a model of the first vehicle, a color of the first vehicle, or a license plate number of the first vehicle. The vehicle device may determine, based on receiving the alert, whether a second location of the vehicle device is in a geographic area associated with the first location, and may cause, when the second location of the vehicle device is determined to be in the geographic area associated with the first location, images or video to be captured of second vehicles in a vicinity of the vehicle device. The vehicle device may process the captured images or video, with a machine learning model, to determine second vehicle data associated with the second vehicles in real time relative to capturing the images or video, and may determine whether the second vehicle data, associated with the second vehicles, substantially includes the first vehicle data associated with the first vehicle. The vehicle device may provide a notification to a device when the second vehicle data, associated with a second vehicle, substantially includes the first vehicle data associated with the first vehicle, where the notification may include the captured images or video of the second vehicles.

In this way, the vehicle device automatically identifies vehicle surroundings, route conditions, and/or points of interest based on captured images or video, which may be used to aid in preventing criminal activity, identifying dangerous route conditions, preventing vehicle accidents, and/or the like. Thus, the vehicle device conserves computing resources (e.g., processing resources, memory resources, and/or the like), communication resources, networking resources, and/or the like that would otherwise be wasted in responding to criminal activity or vehicle accidents, investigating the criminal activity or the vehicle accidents, and/or the like.

FIGS. 1A-1J are diagrams of one or more example implementations 100 described herein. As shown in FIG. 1A, vehicle devices 105 may be associated with a vehicle 110 and a vehicle platform 115. In some implementations, vehicle devices 105 may include devices (e.g., OBD devices, ECUs, and/or the like) that receive vehicle data (e.g., data indicating acceleration, speed, movement, and/or the like) and control other vehicle devices, vehicle sensors that capture the vehicle data, devices (e.g., dash cameras, parking assist cameras, backup assist cameras, and/or the like) that capture images or video, and/or the like associated with vehicles 110. Vehicle platform 115 may include a platform that provides information to vehicle devices 105 and/or controls vehicle devices 105.

As further shown in FIG. 1A, and by reference number 120, vehicle platform 115 may receive an alert that includes particular vehicle data identifying a particular vehicle and location data identifying a suspected location of the particular vehicle. The particular vehicle data may include a year of the particular vehicle, a make of the particular vehicle, a model of the particular vehicle, a color of the particular vehicle, a license plate number of the particular vehicle, other distinguishing features of the particular vehicle, a description of one or more passengers in the particular vehicle, and/or the like. In some implementations, vehicle platform 115 may receive the alert in near real-time relative to occurrence of events that led to the alert (e.g., relative to notification of a child abduction by law enforcement authorities, relative to commission of a crime, and/or the like). Vehicle platform 115 may store the data associated with the alert in a data structure (e.g., a database, a table, a list, and/or the like) associated with vehicle platform 115.

In some implementations, the alert may be associated with an amber alert. An amber alert (e.g., America's Missing: Broadcast Emergency Response (AMBER) alert) is a message distributed by a child abduction alert system that asks the public for help in finding abducted children. An amber alert often includes a name and a description of an abducted child, a description of the suspected abductor (if known), a description (e.g., year, make, model, color, and/or the like) of the abductor's vehicle (e.g., a vehicle owned or leased by the suspected abductor, a vehicle in which the suspected abductor has been seen, and/or the like), a license plate number of the abductor's vehicle (if known), and/or the like. In some implementations, the alert may be associated with other issues that relate to a need to identify, locate, or ascertain a status of a vehicle. For example, the alert may be associated with locating a missing person with mental issues (e.g., mental disabilities), such as a silver alert (e.g., a public notification system that broadcasts information about missing persons, such as senior citizens with Alzheimer's disease, dementia, or other mental disabilities). As other examples, the alert may be associated with a stolen vehicle, with a vehicle used in the commission of a crime, with a vehicle that is fleeing or has fled from a crime scene or a scene of an accident, a vehicle used in escaping from a detention facility (e.g., a prison), and/or the like. The alert may be triggered by input from a law enforcement authority (e.g., into an emergency warning system), by scraping websites or accessing databases (e.g., associated with law enforcement, concerned citizen organizations, and/or the like), by a social media post, and/or the like.

As further shown in FIG. 1A, and by reference number 125, vehicle device 105 may receive the alert, the particular vehicle data, and the location data from vehicle platform 115. In some implementations, vehicle device 105 may receive the alert in near real-time relative to vehicle platform 115 receiving the alert. Additionally, or alternatively, vehicle device 105 may receive the alert from a device associated with a law enforcement agency, from a social media post, and/or the like. In this case, vehicle device 105 may receive the alert in near real-time relative to the device receiving the alert, relative to a posting of the social media post, and/or the like. In some implementations, vehicle device 105 may receive the alert based on an owner or operator of vehicle 110 agreeing to opt in to receipt of such alerts. Vehicle device 105 may store the data associated with the alert in a data structure (e.g., a database, a table, a list, and/or the like) associated with vehicle device 105.

Figure 1B:
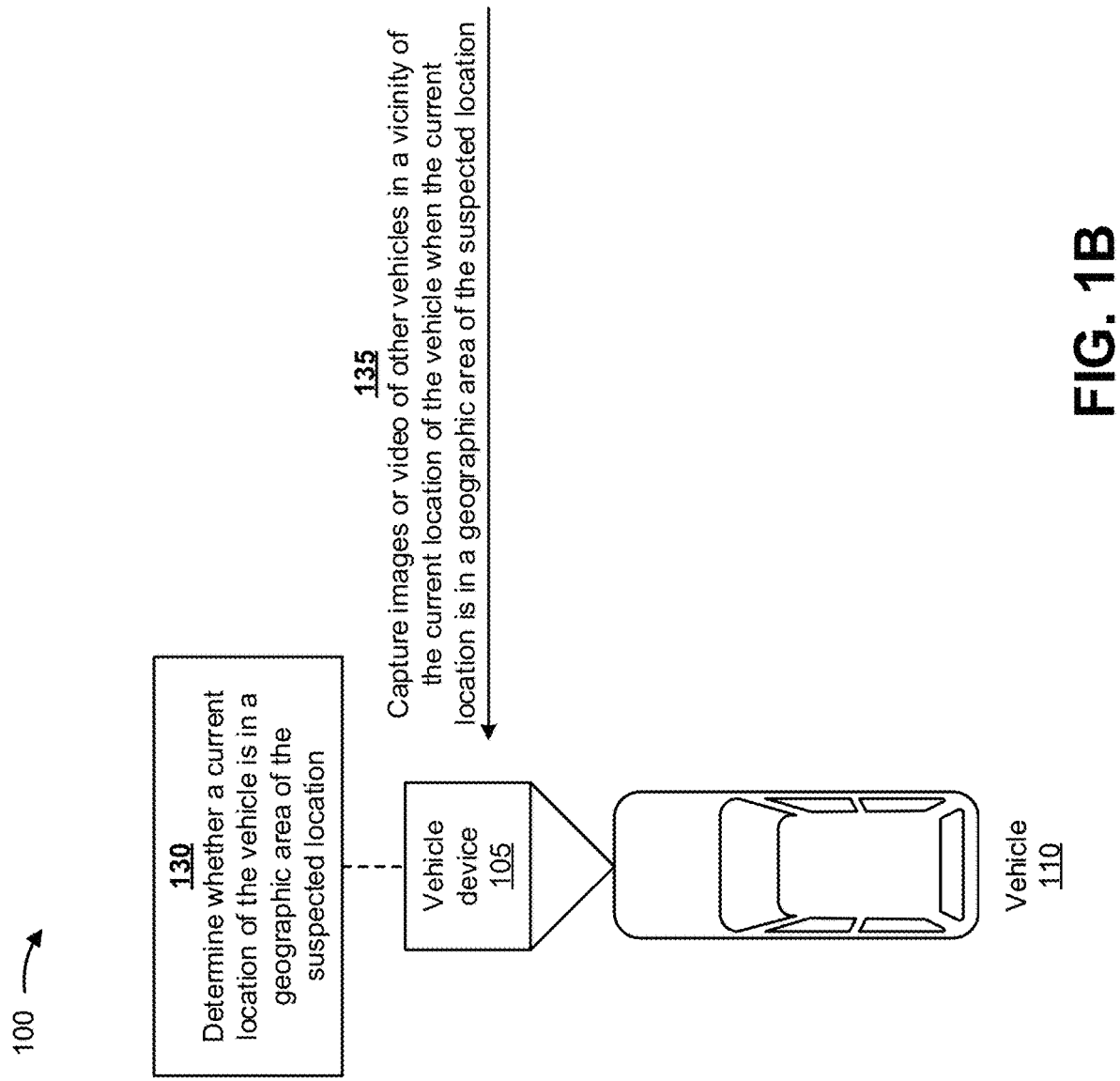

As shown in FIG. 1B, and by reference number 130, vehicle device 105 may determine whether a current location of vehicle 110 is in a geographic area of the suspected location. For example, vehicle device 105 may compare a current location of vehicle 110 (e.g., based on global positioning system (GPS) coordinates of vehicle 110) to the suspected location of the particular vehicle, included in the location data, and may determine that the current location of vehicle 110 is in the geographic area of the suspected location if the current location of vehicle 110 is within a threshold distance of the suspected location included in the location data. In some implementations, vehicle device 105 may determine whether a current location of vehicle 110 is in a geographic area of the suspected location based on additional factors, such as whether the particular vehicle appears to be moving closer to vehicle 110 (e.g., based on multiple consecutive measurements), appears to be moving away from vehicle 110, appears to be traveling on a same road as vehicle 110, and/or the like.

As further shown in FIG. 1B, and by reference number 135, vehicle device 105 may capture images or video of other vehicles in a vicinity of the current location of vehicle 110 when the current location is in a geographic area of the suspected location. For example, vehicle device 105 may activate a dash camera of vehicle 110 to capture the images or video of the other vehicles. Additionally, or alternatively, vehicle device 105 may activate one or more other cameras of vehicle 110 (e.g., a parking assist camera, a backup assist camera, and/or the like) to capture the images or video of the other vehicles. In some implementations, vehicle device 105 may store the captured images or video in the data structure associated with vehicle device 105. In some implementations, vehicle device 105 may aggregate or otherwise combine images or video captured by the dash camera with images or video captured by the one or more other cameras to generate the captured images or video (e.g., to generate images or video of the other vehicles from multiple angles).

Figure 1C:
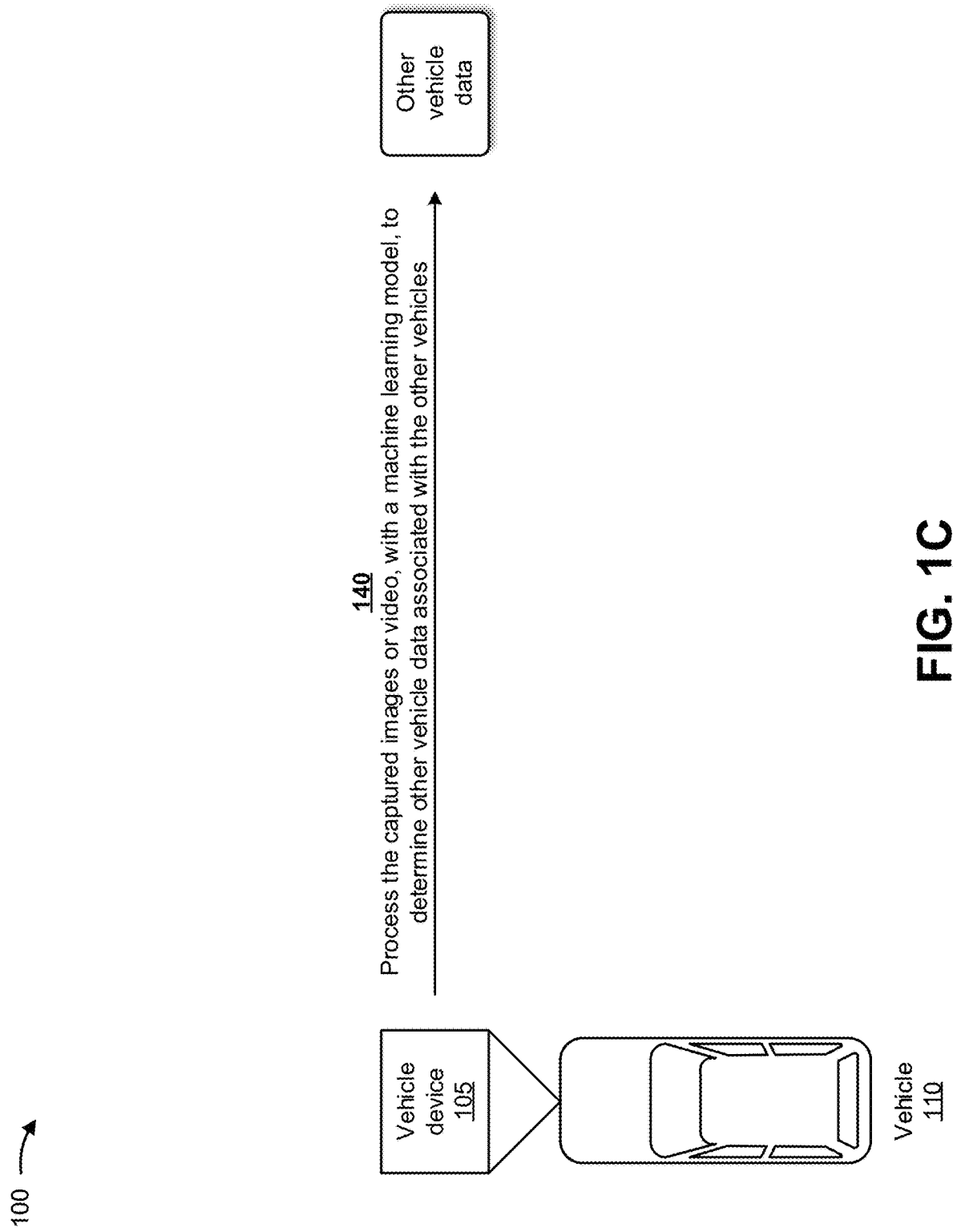

As shown in FIG. 1C, and by reference number 140, vehicle device 105 may process the captured images or video, with a machine learning model, to determine other vehicle data associated with the other vehicles. For example, the other vehicle data may include years (e.g., model years) of the other vehicles in a vicinity of vehicle 110, makes of the other vehicles, models of the other vehicles, colors of the other vehicles, license plate numbers of the other vehicles, other distinguishing features of the other vehicles, descriptions of one or more passengers in the other vehicles, and/or the like. In some implementations, vehicle device 105 may receive the machine learning model from vehicle platform 115. In this case, the machine learning model may be trained by vehicle platform 115. In some implementations, the machine learning model may be periodically updated by vehicle platform 115, and vehicle platform 115 may provide the updated machine learning model to vehicle device 105. In some implementations, vehicle device 105 may analyze the captured images or video to see whether a person in the captured images or video matches a description of a perpetrator or an abducted child within a threshold. In such implementations, vehicle device 105 may obtain an image of the abducted child and may compare the obtained image of the abducted child to people in the captured images or video.

In some implementations, vehicle platform 115 may train the machine learning model, with historical images or video of vehicles, to generate a trained machine learning model that identifies vehicle data (e.g., years, makes, models, colors, license plate numbers, and/or the like of vehicles) based on the historical images or video of the vehicles. For example, the machine learning model may identify vehicle data based on object detection, image classification, optical character recognition, and/or the like. In some implementations, vehicle platform 115 may separate the historical images or video into a training set, a validation set, a test set, and/or the like. The training set may be utilized to train the machine learning model. The validation set may be utilized to validate results of the trained machine learning model. The test set may be utilized to test operation of the machine learning model.

In some implementations, vehicle platform 115 may train the machine learning model using, for example, an unsupervised training procedure and based on the historical images or video. For example, vehicle platform 115 may perform dimensionality reduction to reduce the historical images or video to a minimum feature set, thereby reducing resources (e.g., processing resources, memory resources, and/or the like) to train the machine learning model, and may apply a classification technique to the minimum feature set.

In some implementations, vehicle platform 115 may use a logistic regression classification technique to determine a categorical outcome (e.g., that particular historical images or video indicate particular attributes of other vehicle data or indicate particular driving behaviors, as discussed below). Additionally, or alternatively, vehicle platform 115 may use a naïve Bayesian classifier technique. In this case, vehicle platform 115 may perform binary recursive partitioning to split the historical images or video into partitions and/or branches and use the partitions and/or branches to determine outcomes (e.g., that particular historical images or video indicate particular attributes of other vehicle data or indicate particular driving behaviors). Based on using recursive partitioning, vehicle platform 115 may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, vehicle platform 115 may use a support vector machine (SVM) classifier technique to generate a non-linear boundary between data points in the training set. In this case, the non-linear boundary is used to classify test data into a particular class.

Additionally, or alternatively, vehicle platform 115 may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, vehicle platform 115 may use one or more other model training techniques, such as a neural network technique, a latent semantic indexing technique, and/or the like. For example, vehicle platform 115 may perform an artificial neural network processing technique (e.g., using a two-layer feedforward neural network architecture, a three-layer feedforward neural network architecture, and/or the like) to perform pattern recognition with regard to patterns of the historical images or video. In this case, using the artificial neural network processing technique may improve an accuracy of the trained machine learning model generated by vehicle platform 115 by being more robust to noisy, imprecise, or incomplete data, and by enabling vehicle platform 115 to detect patterns and/or trends undetectable to human analysts or systems using less complex techniques.

In some implementations, rather than training the machine learning model, vehicle platform 115 may receive the trained machine learning model from another device (e.g., a server device). For example, the server device may generate the trained machine learning model based on having trained the machine learning model in a manner similar to that described above, and may provide the trained machine learning model to vehicle platform 115 (e.g., may pre-load vehicle platform 115 with the trained machine learning model, may receive a request from vehicle platform 115 for the trained machine learning model, and/or the like). In some implementations, vehicle device 105 and/or vehicle platform 115 may use may use different machine learning models to identify different other vehicle data based on the captured images or video (e.g., a first machine learning model to identify years, makes, models, and colors of the other vehicles, a second machine learning model to identify license plate numbers of the other vehicles, and/or the like), may combine and further process results from the different machine learning models, and/or the like.

Figure 1D:
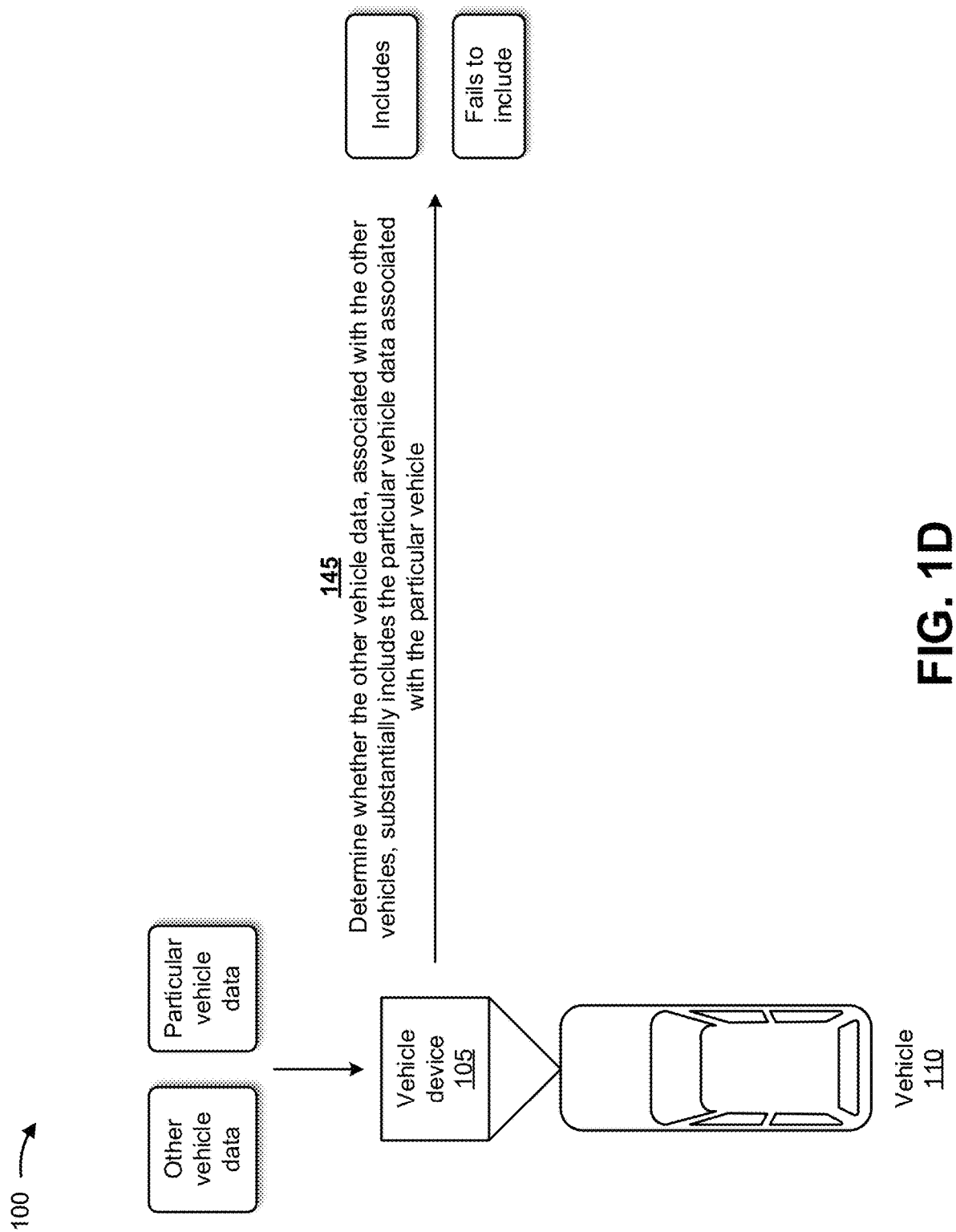

As shown in FIG. 1D, and by reference number 145, vehicle device 105 may determine whether the other vehicle data, associated with the other vehicles, substantially includes the particular vehicle data associated with the particular vehicle. For example, vehicle device 105 may determine whether a year (e.g., an exact year or a range of years), a make, a model, a color, and/or a license plate number of one of the other vehicles in the vicinity of vehicle 110 match the year, the make, the model, the color, and/or the license plate number of the particular vehicle associated with the alert that has been received.

In some implementations, vehicle device 105 may apply different rules and/or different weights to different types of other vehicle data in determining whether the other vehicle data substantially includes the particular vehicle data associated with the particular vehicle. For example, vehicle device 105 may determine that the other vehicle data substantially includes the particular vehicle data if a license plate number of one of the other vehicles matches the license plate number of the particular vehicle. As another example, vehicle device 105 may determine that the other vehicle data substantially includes the particular vehicle data if a make, a model, and a color of one of the other vehicles match the make, the model, and the color of the particular vehicle. As still another example, vehicle device 105 may determine that the other vehicle data substantially includes the particular vehicle data if a make and a color of one of the other vehicles match the make and the color of the particular vehicle, and a license plate number of the other vehicle potentially matches the license plate number of the particular vehicle (e.g., not all characters were recognized, but the recognized characters appear to match).

Figure 1E:
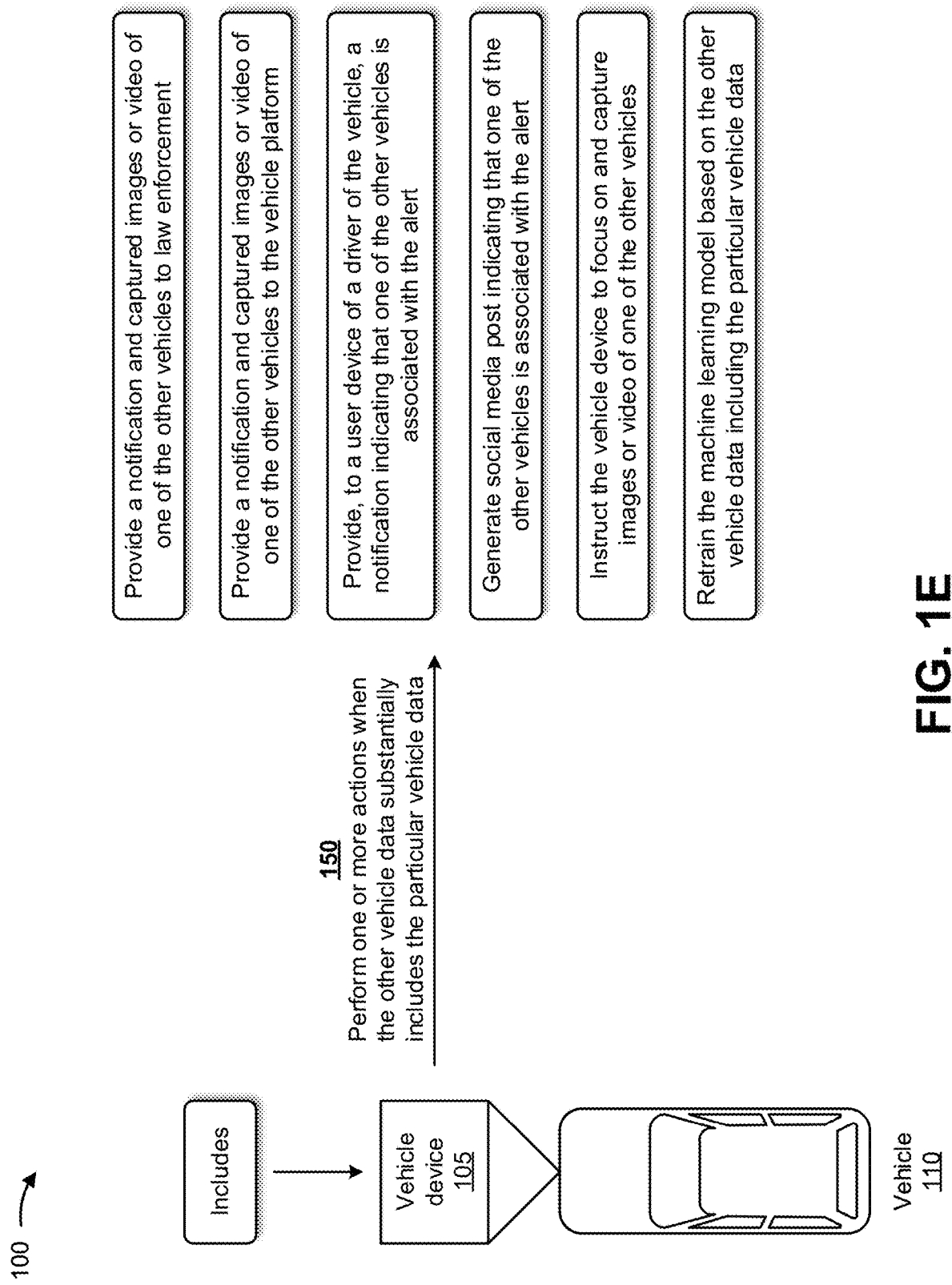

As shown in FIG. 1E, and by reference number 150, vehicle device 105 may perform one or more actions when the other vehicle data substantially includes the particular vehicle data. In some implementations, the one or more actions may include vehicle device 105 providing a notification and captured images or video of one of the other vehicles to a device associated with a law enforcement agency. For example, vehicle platform 115 may provide the notification, the captured images or video, a telephone number of a driver of vehicle 110, an estimated travel speed of the particular vehicle, and/or the like to a device associated with a law enforcement official or agency. In this way, vehicle device 105 may help the law enforcement agency to quickly and/or effectively locate abducted persons, locate missing persons, apprehend criminals, and/or the like. This may potentially prevent death or injury to abducted persons or missing persons, to law enforcement officials, to the driver and other passengers of vehicle 110, to other drivers and passengers, and/or the like, and may conserve resources (e.g., computing resources, communication resources, networking resources, and/or the like) that would otherwise be wasted investigating abducted persons, missing persons, criminal activity, and/or the like.

In some implementations, the one or more actions may include vehicle device 105 providing a notification and captured images or video of one of the other vehicles to vehicle platform 115. In this way, vehicle device 105 may enable (e.g., in near real-time) vehicle platform 115 to contact a law enforcement agency (e.g., as described above) and to aid the law enforcement agency in tracking the particular vehicle, which conserves resources that would otherwise be wasted investigating abducted persons, missing persons, criminal activity, and/or the like. Vehicle device 105 may also enable vehicle platform 115 to contact other parties that may be affected by the particular vehicle (e.g., drivers of other vehicles associated with vehicle platform 115, who may use the information to aid the law enforcement agency in tracking the particular vehicle, to maintain a safe distance from the particular vehicle, to avoid hindering pursuit of the particular vehicle, and/or the like), which may further conserve resources.

In some implementations, the one or more actions may include vehicle device 105 providing, to a user device of a driver of vehicle 110, a notification indicating that one of the other vehicles is associated with the alert. For example, vehicle device 105 may provide, to the user device, a notification that includes information identifying a make, a model, a color, a license plate number, and/or the like of the one of the other vehicles, a description of an operator of the one of the other vehicles, and/or the like. In this way, the driver of vehicle 110 may provide additional information (e.g., a to law enforcement agency) that may help apprehend the operator of the one of the other vehicles, may ensure that the driver of vehicle 110 keeps a safe distance from the one of the other vehicles, and/or the like, which may prevent death or injury to missing persons, to law enforcement officers, to the driver and other passengers of vehicles in the vicinity, and/or the like.

In some implementations, the one or more actions may include vehicle device 105 generating a social media post indicating that one of the other vehicles is associated with the alert. In this way, vehicle device 105 may solicit assistance of others in tracking activity of the one of the other vehicles, may help keep other people a safe distance from the one of the other vehicles, and/or the like, which may conserve resources that would otherwise be wasted by a law enforcement agency to warn citizens.

In some implementations, the one or more actions may include vehicle device 105 instructing another vehicle device 105 in vehicle 110, to focus on and capture images or video of one of the other vehicles. For example, vehicle device 105 may instruct one or more cameras of vehicle 110 to focus on (e.g., lock on) and capture images or video of the one of the other vehicles (e.g., determined to match the particular vehicle). Based on the instruction, the one or more cameras may capture images or video of the one of the other vehicles, without capturing images or video of other vehicles that are not associated with the alert. In this way, vehicle device 105 may conserve resources that would otherwise be wasted capturing images or video that are not relevant to the one of the other vehicles. In some implementations, vehicle device 105 may cause additional images or video to be captured of the one of the other vehicles, may process the additional images or video, with the machine learning model, to determine a driving behavior associated with the one of the other vehicles, and may provide an indication of the driving behavior (e.g., to vehicle platform 115). In this way, vehicle device 105 may improve the accuracy of identifying the one of the other vehicles, and/or may provide additional information (e.g., to a law enforcement agency) that may be helpful in tracking the one of the other vehicles, assessing risks associated with apprehending a driver of the one of the other vehicles, and/or the like.

In some implementations, the one or more actions may include vehicle device 105 retraining the machine learning model based on the other vehicle data including the particular vehicle data. In this way, vehicle device 105 may improve the accuracy of the machine learning model in determining whether other vehicle data, associated with other vehicles, substantially includes particular vehicle data associated with a particular vehicle for which an alert has been received, which may improve speed and efficiency of the model and may conserve computing resources, communication resources, networking resources, and/or the like.

Figure 1F:
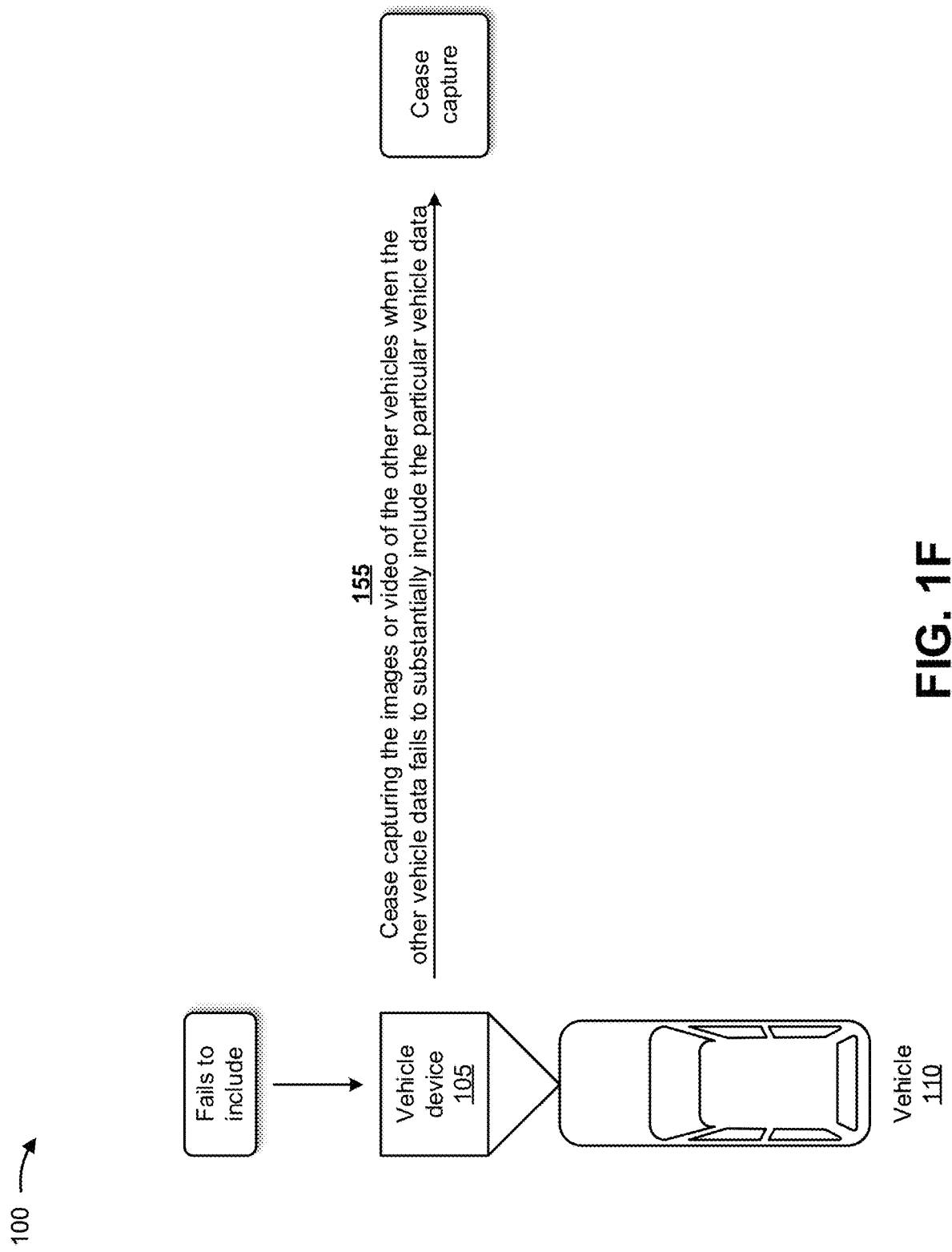

As shown in FIG. 1F, and by reference number 155, vehicle device 105 may cease capturing the images or video of the other vehicles when the other vehicle data fails to substantially include the particular vehicle data. Additionally, or alternatively, vehicle device 105 may receive information indicating that the alert is canceled, and may cease capture of the images or video based on receiving the information indicating that the alert is canceled. In this way, vehicle device 105 may conserve resources (e.g., computing resources, camera resources, communication resources, networking resources, and/or the like) that would otherwise be wasted capturing images or video of other vehicles that are unnecessary and/or irrelevant to an alert.

As shown in FIG. 1G, and by reference number 160, vehicle device 105 may receive, from vehicle platform 115, a request to capture images or video associated with a route between a first location and a second location. In some implementations, vehicle device 105 may receive the request in near real-time relative to an event, such as planning or beginning a trip (e.g., the route) to be taken by vehicle 110. In some implementations, vehicle platform 115 may request to capture the images or video of the route in order to identify dangerous route conditions associated with the route, to capture points of interest associated with the route, and/or the like. In some implementations, vehicle device 105 may inform vehicle platform 115 that it is initiating capture of route video without having received a prior request from vehicle platform 115. For example, vehicle device 105 may inform vehicle platform 115 that vehicle 110 is initiating a trip, and vehicle platform 115 may then instruct vehicle device 105 to capture video of the route. In such implementations, vehicle platform 115 may selectively determine whether the planned route merits video capture, whether other vehicles are (or have recently) captured video for the route, whether to capture video for certain portions of the route, and/or the like.

Figure 1H:
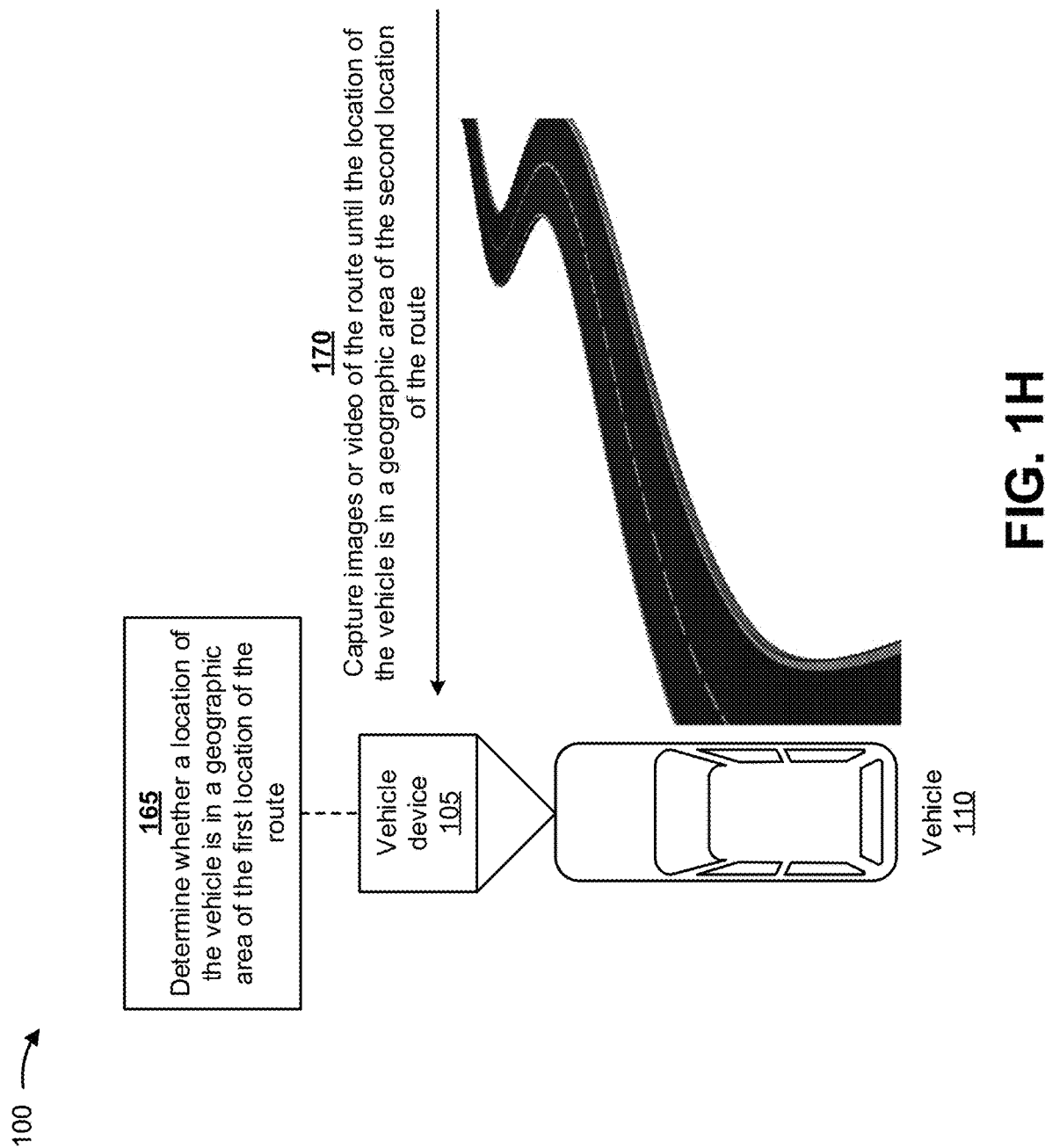

As shown in FIG. 1H, and by reference number 165, vehicle device 105 may determine whether a location of vehicle 110 is in a geographic area of the first location of the route. For example, vehicle device 105 may compare a current location of vehicle 110 (e.g., based on GPS coordinates of vehicle 110) to the first location of the route, and may determine that the location of vehicle 110 is in the geographic area of the first location of the route if the current location of vehicle 110 is within a threshold distance of the first location of the route.

As further shown in FIG. 1H, and by reference number 170, vehicle device 105 may capture images or video of the route until the location of vehicle 110 is in a geographic area of the second location of the route. For example, vehicle device 105 may continuously or periodically compare the current location of vehicle 110 (e.g., based on the GPS coordinates of vehicle 110) to the second location of the route and may continuously determine whether the current location of vehicle 110 is within a threshold distance of the second location of the route. Vehicle device 105 may continuously capture images or video of the route until determining that the current location of vehicle 110 is within the threshold distance of the second location of the route.

In some implementations, vehicle device 105 may activate a dash camera of vehicle 110 to capture the images or video of the route, may activate one or more other cameras of vehicle 110 (e.g., a parking assist camera, a backup assist camera, and/or the like) to capture the images or video of the route, and/or the like. Vehicle device 105 may store the captured images or video in the data structure associated with vehicle device 105. In some implementations, vehicle device 105 may combine images or video captured by the dash camera with images or video captured by the one or more other cameras to generate the captured images or video. Additionally, or alternatively, vehicle device 105 may capture sensor data from one or more sensors associated with vehicle 110, such as vibrations from an accelerometer (e.g., indicating poor route conditions), tire pressures from tire pressure sensors, and/or the like. In some implementations, vehicle device 105 may only capture images or video of the route if a user (e.g., a driver of vehicle 110, a subscriber to a navigation system and/or communication system associated with vehicle platform 115, and/or the like) has elected to opt in to capturing images or video (e.g., of routes traversed by vehicle 110).

Figure 1I:
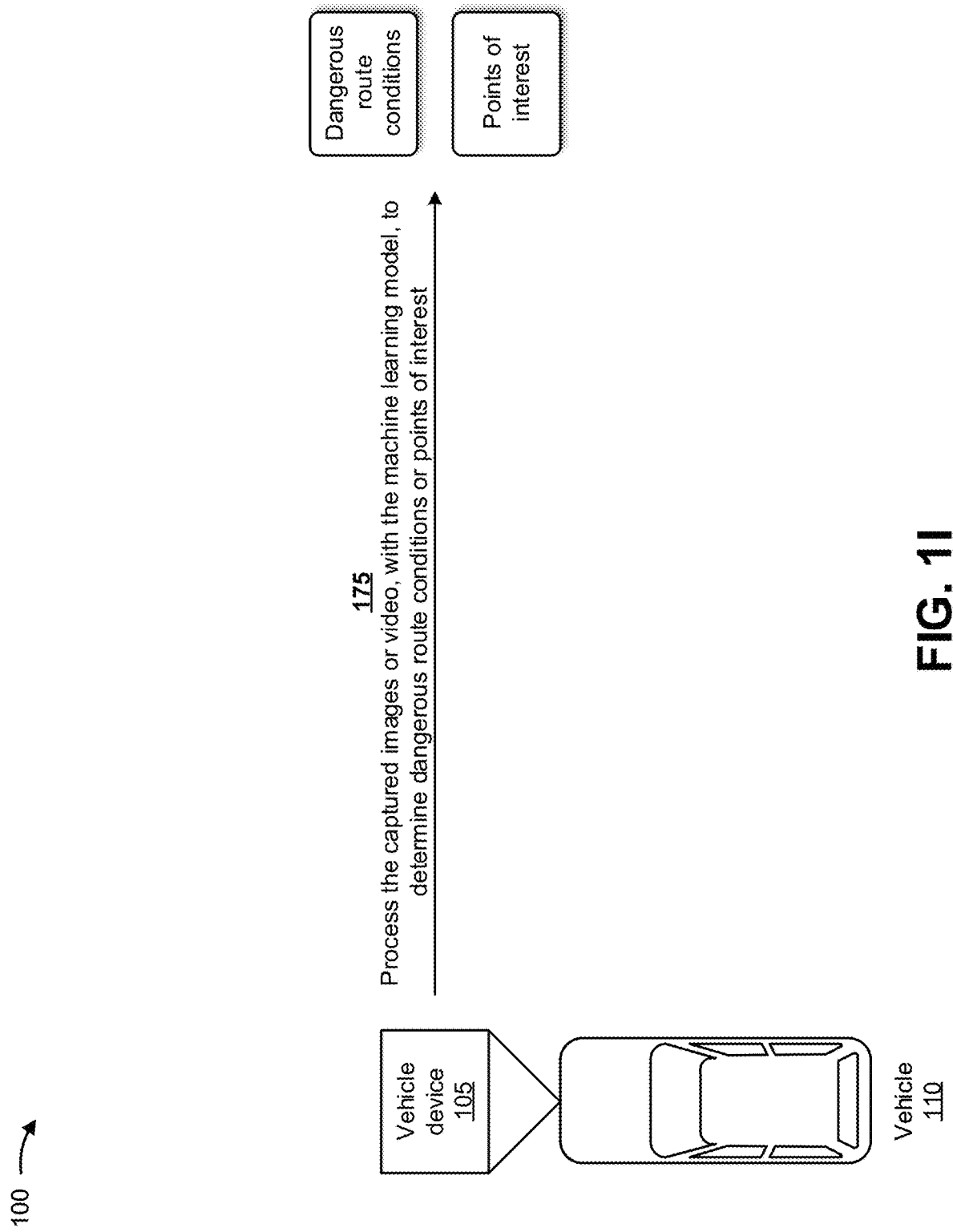

As shown in FIG. 1I, and by reference number 175, vehicle device 105 may process the captured images or video, with the machine learning model, to determine dangerous route conditions or points of interest. The dangerous route conditions may include a pothole, a blind spot, sun glare, a sharp turn, a dangerous intersection, a road with an incline that satisfies a threshold, a road with a decline that satisfies a threshold, and/or the like. The points of interest may include scenic waypoints, fuel stations, restaurants, shopping malls, major landmarks, and/or the like. In some implementations, vehicle device 105 may process the sensor data from the one or more sensors associated with vehicle 110, and the captured images or video, with the machine learning model, to determine the dangerous route conditions. For example, the sensed vibrations and tire pressures may provide an indication of bumpy and dangerous route conditions. The sensor data may also be used to identify specific locations of hazards. For example, the vehicle speed, vibration and location data may be used in conjunction with the identification of a pothole in route video to determine a location of the pothole.

In some implementations, vehicle platform 115 may train the machine learning model, in a manner similar to the machine learning model used to determine other vehicle data and described above in connection with FIG. 1C, to determine dangerous route conditions or points of interest. In some implementations, rather than training the machine learning model, vehicle platform 115 may obtain the machine learning model from another system or device that trained the machine learning model. In this case, vehicle platform 115 may provide the other system or device with historical images or video for use in training the machine learning model, and may provide the other system or device with updated historical images or video to retrain the machine learning model in order to update the machine learning model.

In some implementations, the machine learning model may include a deep learning model that determines dangerous route conditions or points of interest based on the images or video and/or the sensor data. In some implementations, vehicle device 105 may calculate a route safety score for the route based on the dangerous route conditions. In this case, vehicle device 105 may provide the route safety score to another device associated with a transportation agency or a law enforcement agency, vehicle device 105 may utilize the route safety score to select a route to traverse, and/or the like.

Figure 1J:
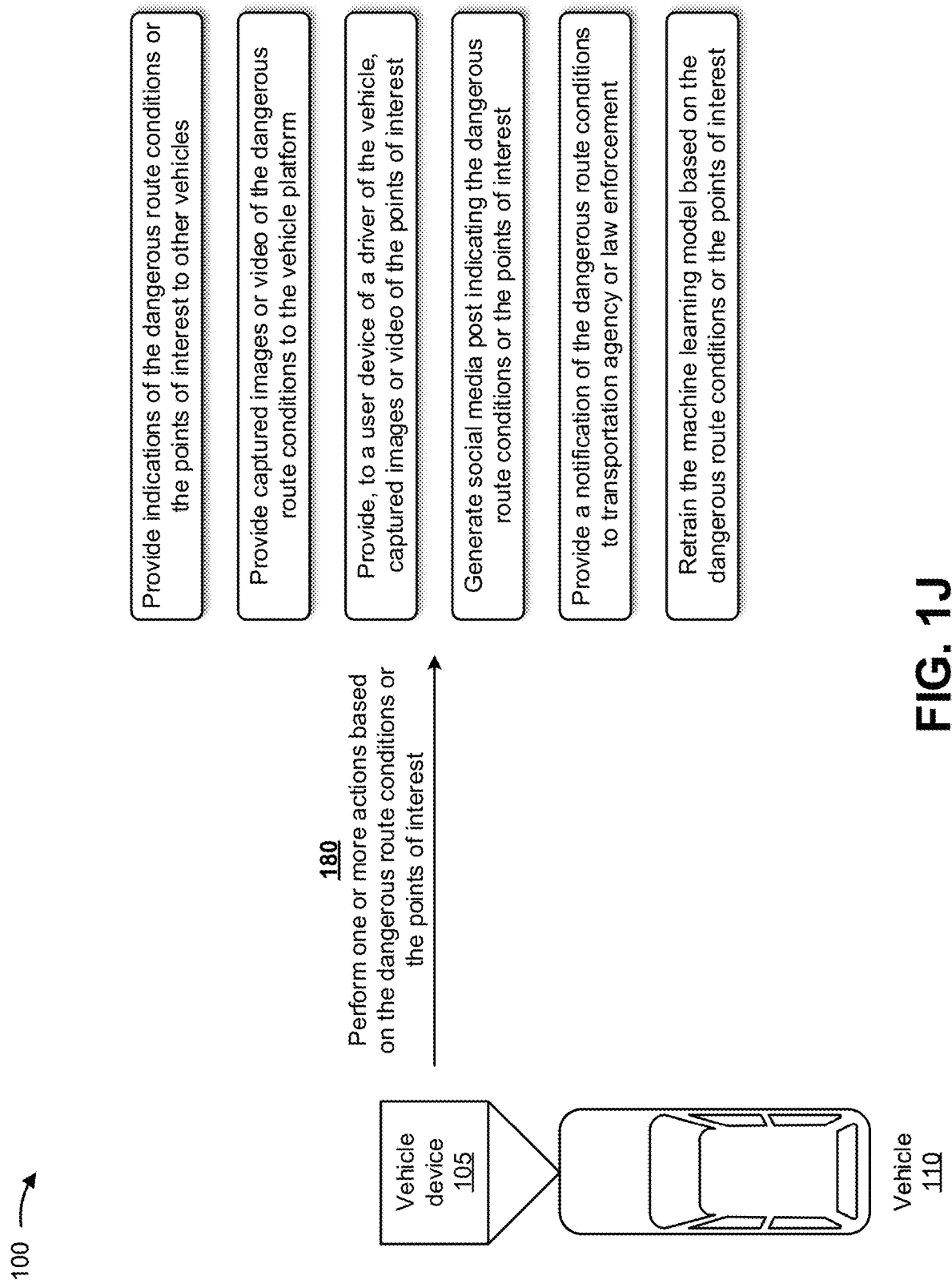

As shown in FIG. 1J, and by reference number 180, vehicle device 105 may perform one or more actions based on the dangerous route conditions or the points of interest. In some implementations, the one or more actions may include vehicle device 105 providing indications of the dangerous route conditions or the points of interest to other vehicles. For example, vehicle device 105 may provide the indications of the dangerous route conditions or the points of interest to other vehicles that traverse a route that includes locations associated with the dangerous route conditions or the points of interest, to navigation systems utilized by drivers of the other vehicles to plan a trip that includes locations associated with the dangerous route conditions or the points of interest, and/or the like. In this way, vehicle device 105 may conserve computing resources, camera resources, communication resources, networking resources, and/or the like that would otherwise be wasted in communicating the dangerous route conditions or the points of interest, responding to vehicle accidents caused by the dangerous route conditions, handling insurance claims associated with the vehicle accidents, and/or the like.

In some implementations, the one or more actions may include vehicle device 105 providing the captured images or video of the dangerous route conditions to vehicle platform 115. For example, vehicle platform 115 may store the captured images or video of the dangerous route conditions in association with locations where the dangerous route conditions occur, and may provide notifications of the dangerous route conditions and/or the captured images or video of the dangerous route conditions to vehicles that traverse routes that include the locations where the dangerous route conditions occur. Additionally, or alternatively, vehicle platform 115 may assess the routes based on the existence and/or extent of dangerous route conditions and may provide a route safety score for each route so a driver may select a safest route. In this way, vehicle device 105 and/or vehicle platform 115 enable drivers to select safer routes, reducing a risk of death or injury associated with vehicle accidents caused by the dangerous route conditions, a risk of damage to property or vehicles caused by the vehicle accidents, and/or the like. This may conserve resources that would otherwise be wasted in treating injuries, repairing damage, handling vehicle accidents, handling legal actions, and/or the like.

In some implementations, the one or more actions may include vehicle device 105 providing, to a user device of a driver of vehicle 110, the captured images or video of the points of interest. For example, vehicle platform 115 may provide the captured images or video of the points of interest previously captured by vehicle 110, captured by other vehicles, and/or the like, that occur at locations included in the route that vehicle 110 traverses, that a driver of vehicle 110 considers in planning a trip, and/or the like. The user device of the driver of vehicle 110 may display the captured images or video of the points of interest (e.g., in a route or trip preview) for use by the driver of vehicle 110 in planning the trip and/or traversing the route. In this way, vehicle device 105 and/or vehicle platform 115 may enable drivers to select desirable routes without requiring further research, thereby conserving computing resources, networking resources, and/or the like that would otherwise be required to perform such research.

In some implementations, the one or more actions may include vehicle device 105 generating a social media post indicating the dangerous route conditions or the points of interest. In this way, vehicle device 105 may warn drivers of other vehicles of the dangerous route conditions, where the drivers of the other vehicles may follow social media but may not have in-vehicle devices that receive indications of the dangerous route conditions, thereby enabling a broader range of people to be informed of the dangerous route conditions or the points of interest.

In some implementations, the one or more actions may include vehicle device 105 providing a notification of the dangerous route conditions to a transportation agency or a law enforcement agency. For example, vehicle device 105 may provide a notification of the dangerous route conditions to a transportation agency or a law enforcement agency that provides public notification, warning systems, and/or the like to drivers who may traverse or plan to take routes that include the dangerous route conditions. In this way, vehicle device 105 may allow drivers to avoid dangers, reduce the risk of accidents and potentially reduce traffic that may be associated with such accidents or otherwise associated with the dangerous route conditions. This may conserve computing resources, communication resources, networking resources, and/or the like that would otherwise be wasted in communicating the dangerous route conditions, responding to vehicle accidents caused by the dangerous route conditions, handling insurance claims associated with the vehicle accidents, and/or the like.

In some implementations, the one or more actions may include vehicle platform 115 retraining the machine learning model based on the dangerous route conditions or the points of interest. In this way, vehicle platform 115 may improve the accuracy of the machine learning model in determining dangerous route conditions or the points of interest, which may improve speed and efficiency of the model and conserve computing resources, communication resources, networking resources, and/or the like.

In some implementations, one or more functions described above as being performed by vehicle device 105, may be performed by vehicle platform 115 or may be performed by a combination of vehicle device 105 and vehicle platform 115.

In this way, several different stages of the process for identifying vehicle surroundings, route conditions, and/or points of interest based on captured images or video is automated via machine learning, which may remove human subjectivity and waste from the process, and which may improve speed and efficiency of the process and conserve computing resources (e.g., processing resources, memory resources, and/or the like), communication resources, networking resources, and/or the like. Furthermore, implementations described herein use a rigorous, computerized process to perform tasks or roles that were not previously performed or were previously performed using subjective human intuition or input. For example, currently there does not exist a technique that utilizes machine learning to identify vehicle surroundings, route conditions, and points of interest based on captured images or video. Finally, the process for identifying vehicle surroundings, route conditions, and points of interest based on captured images or video conserves computing resources, communication resources, networking resources, and/or the like that would otherwise be wasted in responding to criminal activity or vehicle accidents, investigating the criminal activity or the vehicle accidents, and/or the like.

As indicated above, FIGS. 1A-1J are provided merely as examples. Other examples may differ from what was described with regard to FIGS. 1A-1J. The number and arrangement of devices and networks shown in FIGS. 1A-1J are provided as an example. In practice, there may be additional devices and/or networks, fewer devices and/or networks, different devices and/or networks, or differently arranged devices and/or networks than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) of FIGS. 1A-1J may perform one or more functions described as being performed by another set of devices of FIGS. 1A-1J.

Figure 2:
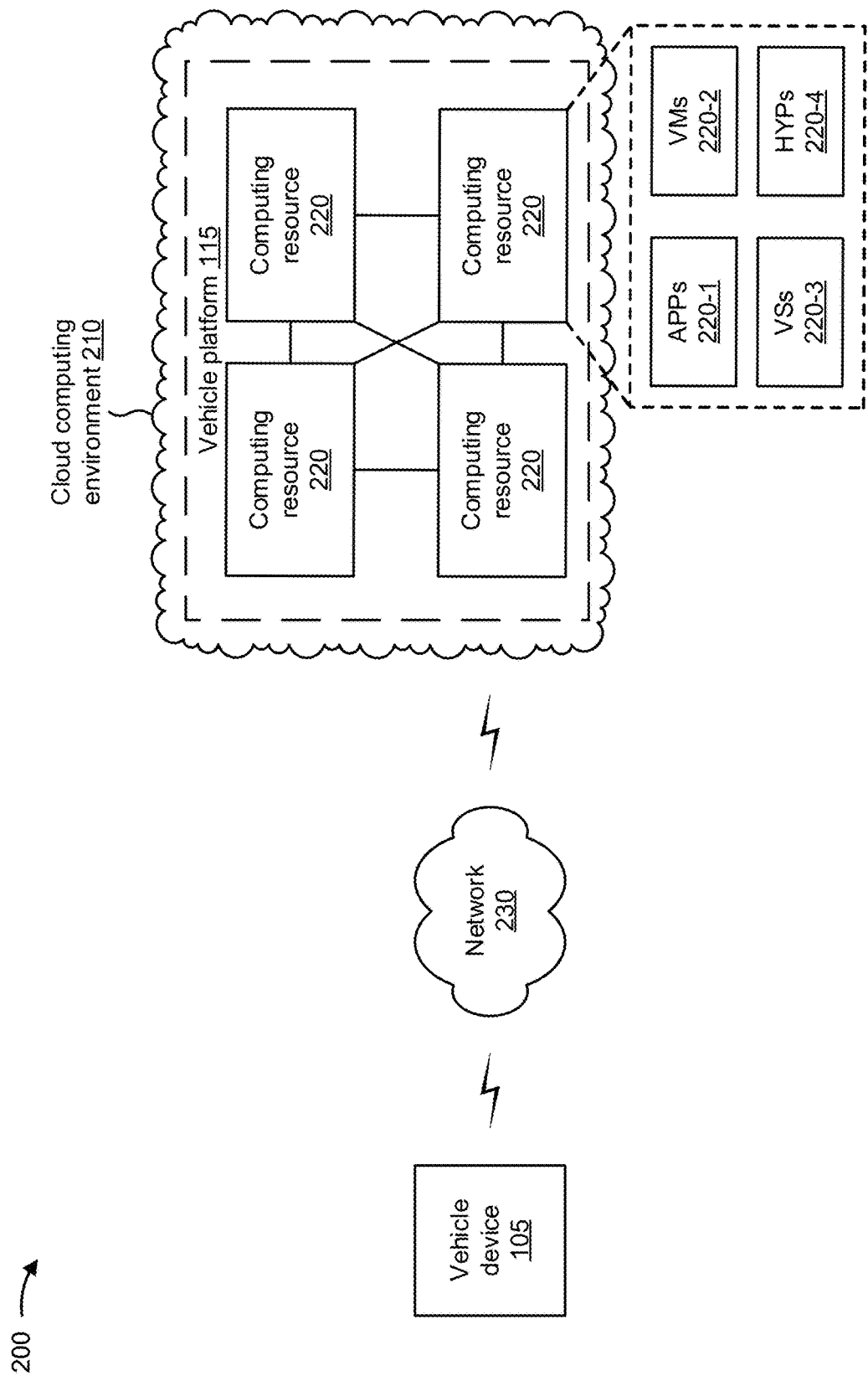
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include vehicle device 105, vehicle platform 115, and a network 230. Devices of environment 200 may interconnect via wired connections, wireless connections, or a combination of wired and wireless connections.

Vehicle device 105 includes one or more devices capable of receiving, generating, storing, processing, and/or providing information, such as information described herein. For example, vehicle device 105 may include a mobile phone (e.g., a smart phone, a radiotelephone, etc.), a laptop computer, a tablet computer, a handheld computer, a device included in vehicle 110 (e.g., an inertial measurement unit, a three-axis accelerometer, a global positioning system (GPS) device, an OBD device, an ECU, a dash camera, a parking assist camera, a backup assist camera, and/or the like) or a similar type of device. In some implementations, one or more vehicle devices 105 may utilize machine learning to identify vehicle surroundings, route conditions, and/or points of interest based on captured images or video. In some implementations, vehicle device 105 may receive information from and/or transmit information to vehicle platform 115.

Vehicle platform 115 includes one or more devices that utilize machine learning to identify vehicle surroundings, route conditions, and/or points of interest based on captured images or video. In some implementations, vehicle platform 115 may be designed to be modular such that certain software components may be swapped in or out depending on a particular need. As such, vehicle platform 115 may be easily and/or quickly reconfigured for different uses. In some implementations, vehicle platform 115 may receive information from and/or transmit information to one or more vehicle devices 105.

In some implementations, as shown, vehicle platform 115 may be hosted in a cloud computing environment 210. Notably, while implementations described herein describe vehicle platform 115 as being hosted in cloud computing environment 210, in some implementations, vehicle platform 115 may not be cloud-based (i.e., may be implemented outside of a cloud computing environment) or may be partially cloud-based.

Cloud computing environment 210 includes an environment that hosts vehicle platform 115. Cloud computing environment 210 may provide computation, software, data access, storage, etc., services that do not require end-user knowledge of a physical location and configuration of system(s) and/or device(s) that hosts vehicle platform 115. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host vehicle platform 115. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by vehicle device 105. Application 220-1 may eliminate a need to install and execute the software applications on vehicle device 105. For example, application 220-1 may include software associated with vehicle platform 115 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of vehicle device 105 or an operator of vehicle platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
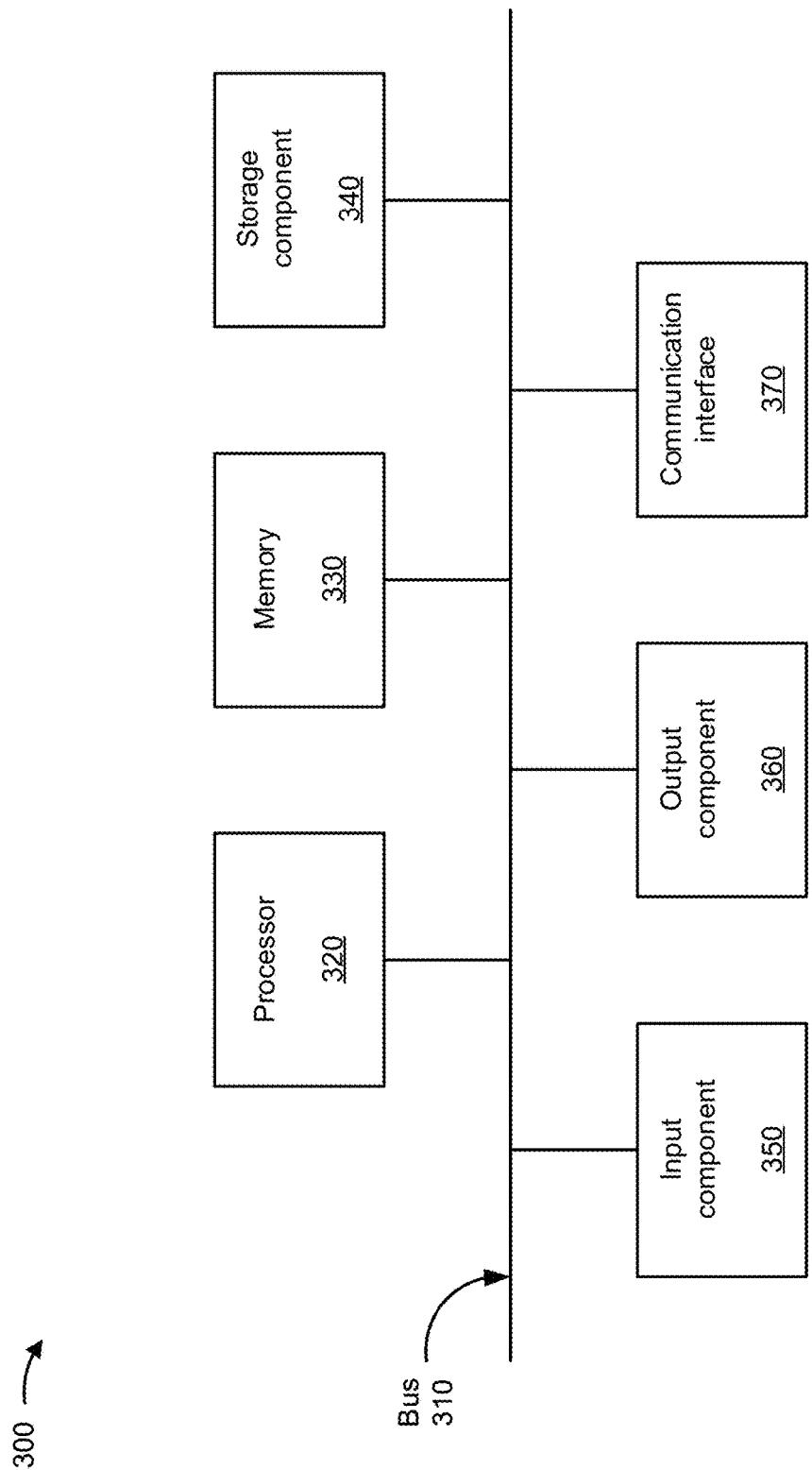
FIG. 3 is a diagram of example components of one or more devices of FIG. 2.

FIG. 3 is a diagram of example components of a device 300. Device 300 may correspond to vehicle device 105, vehicle platform 115, and/or computing resource 220. In some implementations, vehicle device 105, vehicle platform 115, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing machine learning to identify vehicle surroundings, route conditions, and/or points of interest based on captured images or video. In some implementations, one or more process blocks of FIG. 4 may be performed by a device (e.g., vehicle device 105). In some implementations, one or more process blocks of FIG. 4 may be performed by another device or a group of devices separate from or including the device, such as a vehicle platform (e.g., vehicle platform 115).

As shown in FIG. 4, process 400 may include receiving an alert, wherein the alert includes first vehicle data associated with a first vehicle, and first location data identifying a first location relating to the alert, wherein the first vehicle data includes data identifying at least one of a year of the first vehicle, a make of the first vehicle, a model of the first vehicle, a color of the first vehicle, or and a license plate number of the first vehicle (block 410). For example, the device (e.g., using processor 320, communication interface 370, and/or the like) may receive an alert, as described above. In some implementations, the alert may include first vehicle data associated with a first vehicle, and first location data identifying a first location relating to the alert. In some implementations, the first vehicle data may include data identifying at least one of a year of the first vehicle, a make of the first vehicle, a model of the first vehicle, a color of the first vehicle, or and a license plate number of the first vehicle. In some implementations, the alert may be received from a vehicle platform, a device associated with a law enforcement agency, or a social media post.

As further shown in FIG. 4, process 400 may include determining, based on receiving the alert, whether a second location of the device is in a geographic area associated with the first location (block 420). For example, the device (e.g., using processor 320, memory communication interface 370, and/or the like) may determine, based on receiving the alert, whether a second location of the device is in a geographic area associated with the first location, as described above.

As further shown in FIG. 4, process 400 may include causing, when the second location of the device is determined to be in the geographic area associated with the first location, images or video to be captured of second vehicles in a vicinity of the device (block 430). For example, the device (e.g., using processor 320, storage component 340, communication interface 370, and/or the like) may cause, when the second location of the device is determined to be in the geographic area associated with the first location, images or video to be captured of second vehicles in a vicinity of the device, as described above.

As further shown in FIG. 4, process 400 may include processing the captured images or video, with a machine learning model, to determine second vehicle data associated with the second vehicles in real time relative to capturing the images or video (block 440). For example, the device (e.g., using processor 320, memory 330, and/or the like) may process the captured images or video, with a machine learning model, to determine second vehicle data associated with the second vehicles in real time relative to capturing the images or video, as described above. In some implementations, the second vehicle data may include data identifying years of second vehicles, makes of the second vehicles, models of the second vehicles, colors of the second vehicles, or license plate numbers of the second vehicles. In some implementations, the machine learning model may be received from the vehicle platform, wherein the machine learning model is trained by the vehicle platform.

As further shown in FIG. 4, process 400 may include determining whether the second vehicle data, associated with the second vehicles, substantially includes the first vehicle data associated with the first vehicle (block 450). For example, the device (e.g., using processor 320, memory 330, storage component 340, and/or the like) may determine whether the second vehicle data, associated with the second vehicles, substantially includes the first vehicle data associated with the first vehicle, as described above. In some implementations, when determining whether the second vehicle data, associated with the second vehicles, substantially includes the first vehicle data, process may include determining whether a threshold quantity of the data identifying the year of the first vehicle, the make of the first vehicle, the model of the first vehicle, the color of the first vehicle, and/or the license plate number of the first vehicle is included in the second vehicle data.

As further shown in FIG. 4, process 400 may include providing a notification to another device when the second vehicle data, associated with a second vehicle, substantially includes the first vehicle data associated with the first vehicle, wherein the notification includes the captured images or video of the second vehicles (block 460). For example, the device (e.g., using processor 320, memory 330, storage component 340, communication interface 370, and/or the like) may provide a notification to another device when the second vehicle data, associated with a second vehicle, substantially includes the first vehicle data associated with the first vehicle, as described above. In some implementations, the notification may include the captured images or video of the second vehicles. In some implementations, the alert may be associated with criminal activity and the other device may be associated with a law enforcement agency.

Process 400 may include additional implementations, such as any single implementation or any combination of implementations described below and/or in connection with one or more other processes described elsewhere herein.

In some implementations, process 400 may include ceasing capture of the images or video when the second vehicle data, associated with a second vehicle, fails to substantially include the first vehicle data associated with the first vehicle.

In some implementations, process 400 may include providing, to a user device and when the second vehicle data substantially includes the first vehicle data, another notification indicating that one of the second vehicles is associated with the alert.

In some implementations, process 400 may include generating, when the second vehicle data substantially includes the first vehicle data, a social media post indicating that one of the second vehicles is associated with the alert.

In some implementations, process 400 may include causing, when the second vehicle data substantially includes the first vehicle data, additional images or video to be captured of one of the second vehicles that is associated with the alert.

In some implementations, process 400 may include causing, when the second vehicle data substantially includes the first vehicle data, additional images or video to be captured of one of the second vehicles that is associated with the alert; processing the additional images or video, with the machine learning model, to determine a driving behavior associated with the one of the second vehicles; and providing an indication of the driving behavior to the other device.

In some implementations, process 400 may include receiving information indicating that the alert is canceled, and ceasing capture of the images or video based on receiving the information indicating that the alert is canceled.

In some implementations, process 400 may include receiving a request to capture images or video associated with a route between a first location and a second location; determining whether a location of the device is in a geographic area of the first location of the route; causing images or video of the route to be captured until the location of the device is in a geographic area of the second location of the route; processing the captured images or video, with a machine learning model, to determine dangerous route conditions or points of interest in real time relative to capturing the captured images or video; and performing one or more actions based on determining the dangerous route conditions or the points of interest.

In some implementations, when performing the one or more actions, process 400 may include providing indications of the dangerous route conditions or the points of interest to other devices associated with other vehicles; providing the captured images or video of the dangerous route conditions or the points of interest to a vehicle platform; or providing, to a user device associated with a driver of the vehicle, the captured images or video of the points of interest.

In some implementations, when perform the one or more actions, process 400 may include generating a social media post indicating the dangerous route conditions or the points of interest and including the captured images or video of the dangerous route conditions or the points of interest; providing a notification of the dangerous route conditions to another device associated with a transportation agency or a law enforcement agency; or retraining the machine learning model based on the dangerous route conditions or the points of interest.

In some implementations, the dangerous route conditions may include a pot hole, a blind spot, sun glare, a sharp turn, a dangerous intersection, a road with an incline that satisfies a threshold, or a road with a decline that satisfies a threshold.

In some implementations, process 400 may include capturing sensor data from one or more sensors associated with the vehicle, and processing the sensor data and the captured images or video, with the machine learning model, to determine the dangerous route conditions.

In some implementations, process 400 may include calculating a route safety score for the route based on the dangerous route conditions, and providing the route safety score to another device associated with a transportation agency or a law enforcement agency.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
 receiving, by an in-vehicle device, an alert,
  wherein the alert includes:
   first vehicle data associated with a first vehicle, and
   first location data identifying a first location relating to the alert,
    wherein the first vehicle data includes data identifying at least one of:
     a year of the first vehicle,
     a make of the first vehicle,
     a model of the first vehicle,
     a color of the first vehicle, or
     a license plate number of the first vehicle;
 determining, by the in-vehicle device and based on receiving the alert, whether a second location of the in-vehicle device is in a geographic area associated with the first location;
 causing, by the in-vehicle device and when the second location of the in-vehicle device is determined to be in the geographic area associated with the first location, images or video to be captured of second vehicles in a vicinity of the in-vehicle device;
 processing, by the in-vehicle device, the captured images or video, with a machine learning model, to determine second vehicle data associated with the second vehicles in real time relative to capturing the images or video;
 determining, by the in-vehicle device, whether the second vehicle data, associated with the second vehicles, substantially includes the first vehicle data associated with the first vehicle; and
 providing, by the in-vehicle device, a notification to a device when the second vehicle data, associated with a second vehicle, substantially includes the first vehicle data associated with the first vehicle,
  wherein the notification includes the captured images or video of the second vehicles.

2. The method of claim 1, further comprising:
 ceasing capture of the images or video when the second vehicle data, associated with a second vehicle, fails to substantially include the first vehicle data associated with the first vehicle.

3. The method of claim 1, further comprising:
 providing, to a user device and when the second vehicle data substantially includes the first vehicle data, another notification indicating that one of the second vehicles is associated with the alert.

4. The method of claim 1, further comprising:
 generating, when the second vehicle data substantially includes the first vehicle data, a social media post indicating that one of the second vehicles is associated with the alert.

5. The method of claim 1, further comprising:
 causing, when the second vehicle data substantially includes the first vehicle data, additional images or video to be captured of one of the second vehicles that is associated with the alert.

6. The method of claim 1, further comprising:
 causing, when the second vehicle data substantially includes the first vehicle data, additional images or video to be captured of one of the second vehicles that is associated with the alert;
 processing the additional images or video, with the machine learning model, to determine a driving behavior associated with the one of the second vehicles; and
 providing an indication of the driving behavior to the device.

7. The method of claim 1, wherein determining whether the second vehicle data, associated with the second vehicles, substantially includes the first vehicle data comprises:
 determining whether a threshold quantity of the data identifying the year of the first vehicle, the make of the first vehicle, the model of the first vehicle, the color of the first vehicle, and/or the license plate number of the first vehicle is included in the second vehicle data.

8. A device, comprising:
 one or more memories; and
 one or more processors, communicatively coupled to the one or more memories, configured to:
  receive an alert,
   wherein the alert includes:
    first object data associated with a first object, and
    first location data identifying a first location relating to the alert;
  determine, based on receiving the alert, whether a second location of the device is in a geographic area associated with the first location;
  cause, when the second location of the device is determined to be in the geographic area associated with the first location, images or video to be captured of second objects in a vicinity of the device;
  process the captured images or video, with a machine learning model, to determine second object data associated with the second objects;
  determine whether the second object data, associated with the second objects, substantially includes the first object data associated with the first object; and
  perform one or more actions when the second object data, associated with a second object, substantially includes the first object data associated with the first object,
   wherein the one or more actions include:
    providing, to another device, a notification that includes the captured images or video of the second objects,
    generating a social media post indicating that one of the second objects is associated with the alert, or
    cause additional images or video to be captured of one of the second objects that is associated with the alert.

9. The device of claim 8, wherein the one or more processors are further configured to:
 receive information indicating that the alert is canceled; and
 cease capture of the images or video based on receiving the information indicating that the alert is canceled.

10. The device of claim 8, wherein the second object data includes data identifying at least one of:
 years of vehicles in a vicinity of the device,
 makes of the vehicles,
 models of the vehicles,
 colors of the vehicles, or
 license plate numbers of the vehicles.

11. The device of claim 8, wherein the alert is associated with criminal activity and the other device is associated with a law enforcement agency.

12. The device of claim 8, wherein the one or more processors are further configured to:
  receive the machine learning model from a vehicle platform,
    wherein the machine learning model is trained by the vehicle platform.

13. The device of claim 8, wherein the alert is received from one or more of:
  a vehicle platform,
  a device associated with a law enforcement agency, or
  a social media post.

14. The device of claim 8, wherein the device is included in a vehicle.

15. A non-transitory computer-readable medium storing instructions, the instructions comprising:
  one or more instructions that, when executed by one or more processors of a device in a vehicle, cause the one or more processors to:
    receive a request to capture images or video associated with a route between a first location and a second location;
    determine whether a location of the vehicle is in a geographic area of the first location of the route;
    cause images or video of the route to be captured until the location of the vehicle is in a geographic area of the second location of the route;
    process the captured images or video, with a machine learning model, to determine dangerous route conditions or points of interest in real time relative to capturing the captured images or video; and
    perform one or more actions based on determining the dangerous route conditions or the points of interest.

16. The non-transitory computer-readable medium of claim 15, wherein the one or more instructions, that cause the one or more processors to perform the one or more actions, cause the one or more processors to:
  provide indications of the dangerous route conditions or the points of interest to other devices associated with other vehicles,
  provide the captured images or video of the dangerous route conditions or the points of interest to a vehicle platform, or
  provide, to a user device associated with a driver of the vehicle, the captured images or video of the points of interest.

17. The non-transitory computer-readable medium of claim 15, wherein the one or more instructions, that cause the one or more processors to perform the one or more actions, cause the one or more processors to:
  generate a social media post indicating the dangerous route conditions or the points of interest and including the captured images or video of the dangerous route conditions or the points of interest,
  provide a notification of the dangerous route conditions to another device associated with a transportation agency or a law enforcement agency, or
  retrain the machine learning model based on the dangerous route conditions or the points of interest.

18. The non-transitory computer-readable medium of claim 15, wherein the dangerous route conditions include one or more of:
  a pot hole,
  a blind spot,
  sun glare,
  a sharp turn,
  a dangerous intersection,
  a road with an incline that satisfies a threshold, or
  a road with a decline that satisfies a threshold.

19. The non-transitory computer-readable medium of claim 15, wherein the instructions further comprise:
  one or more instructions that, when executed by the one or more processors, cause the one or more processors to:
    capture sensor data from one or more sensors associated with the vehicle; and
    process the sensor data and the captured images or video, with the machine learning model, to determine the dangerous route conditions.

20. The non-transitory computer-readable medium of claim 15, wherein the instructions further comprise:
  one or more instructions that, when executed by the one or more processors, cause the one or more processors to:
    calculate a route safety score for the route based on the dangerous route conditions; and
    provide the route safety score to another device associated with a transportation agency or a law enforcement agency.

* * * * *